United States Patent
Cobb et al.

(10) Patent No.: US 12,018,762 B2
(45) Date of Patent: Jun. 25, 2024

(54) MECHANICAL VALVE FOR PRESSURE CONTROL

(71) Applicant: Equilibar, LLC, Fletcher, NC (US)

(72) Inventors: Zachary Allan Cobb, Candler, NC (US); Ryan Matthew Heffner, Asheville, NC (US); Jeffrey D. Jennings, Hendersonville, NC (US)

(73) Assignee: Equilibar, LLC, Fletcher, NC (US)

( * ) Notice: Subject to any disclaimer, the term of this patent is extended or adjusted under 35 U.S.C. 154(b) by 17 days.

(21) Appl. No.: 17/916,700

(22) PCT Filed: Apr. 2, 2021

(86) PCT No.: PCT/US2021/025583
§ 371 (c)(1),
(2) Date: Oct. 3, 2022

(87) PCT Pub. No.: WO2021/203003
PCT Pub. Date: Oct. 7, 2021

(65) Prior Publication Data
US 2023/0151899 A1 May 18, 2023

Related U.S. Application Data

(60) Provisional application No. 63/004,452, filed on Apr. 2, 2020.

(51) Int. Cl.
*F16K 17/12* (2006.01)
*F16K 17/04* (2006.01)
*F16K 17/06* (2006.01)

(52) U.S. Cl.
CPC ...... *F16K 17/0466* (2013.01); *F16K 17/0406* (2013.01); *F16K 17/06* (2013.01); *F16K 17/12* (2013.01); *F16K 2200/402* (2021.08)

(58) Field of Classification Search
CPC ...... F16K 17/12; F16K 17/0406; F16K 17/06; Y10T 137/791; Y10T 137/0466
See application file for complete search history.

(56) References Cited

U.S. PATENT DOCUMENTS 3,529,625 A    9/1970  Ferrari
4,253,687 A *  3/1981  Maples ................ F16L 15/007
                                                    285/332.3

(Continued)

FOREIGN PATENT DOCUMENTS

FR      3052223      12/2017
WO    2017167677    10/2017

OTHER PUBLICATIONS

International Search Report and Written Opinion issued for related International Patent Application No. PCT/US21/25583 on Jul. 8, 2021.

*Primary Examiner* — P. Macade Nichols
(74) *Attorney, Agent, or Firm* — Trego, Hines & Ladenheim, PLLC; Jonathan M. Hines (57) ABSTRACT

A valve includes: a housing defining a chamber communicating with an inlet port and an exhaust port, a seat disposed in the housing between the inlet port and the exhaust port; an elastomeric or polymer sealing ring disposed in the seat; a valve element having a sealing surface that is a body of revolution, the valve element positioned in the housing such that it is moveable between a closed position in which the sealing surface is engaged with the sealing ring and an open position in which the sealing surface is disengaged from sealing ring; and at least one bypass channel defined in the chamber, arranged to communicate between the seat and the exhaust port when the valve element is in the open position.

13 Claims, 10 Drawing Sheets

(56) References Cited

U.S. PATENT DOCUMENTS

| | | | |
|---|---|---|---|
| 4,446,886 A | | 5/1984 | Taylor et al. |
| 4,474,208 A | | 10/1984 | Looney |
| 4,601,305 A | * | 7/1986 | Nordskog ............... F16K 15/04 |
| | | | 137/528 |
| 5,137,049 A | * | 8/1992 | Orlowski ............... F16K 17/12 |
| | | | 137/533.11 |
| 5,797,426 A | * | 8/1998 | Powell .................... F25D 21/14 |
| | | | 137/533.15 |
| 9,447,890 B2 | | 9/2016 | Jennings et al. |
| 11,193,703 B1 | | 12/2021 | Heffner et al. |
| 11,448,327 B2 | | 9/2022 | Heffner et al. |
| 2006/0272711 A1 | * | 12/2006 | Talaski .................. F16K 15/044 |
| | | | 137/539 |
| 2014/0276348 A1 | | 9/2014 | Alan |

\* cited by examiner

MECHANICAL VALVE FOR PRESSURE CONTROL

BACKGROUND OF THE INVENTION

The present invention relates to pressure regulation in fluid systems, and more particularly to mechanical valves for pressure regulation.

Known types of gas systems, such as medical equipment, require pressure regulation or pressure relief at low pressures, for example in the range from 5 to 100 mbar.

The majority of prior art systems use spring loaded valve which are not known to provide very precise pressure control.

Accordingly, there remains a need for precise mechanical pressure control valves.

BRIEF SUMMARY OF THE INVENTION

This need is addressed by a mechanical valve incorporating a valve element and a sealing ring.

According to one aspect of the technology described herein, a valve includes: a housing defining a chamber communicating with an inlet port and an exhaust port, a seat disposed in the housing between the inlet port and the exhaust port; an elastomeric or polymer sealing ring disposed in the seat; a valve element having a sealing surface that is a body of revolution, the valve element positioned in the housing such that it is moveable between a closed position in which the sealing surface is engaged with the sealing ring and an open position in which the sealing surface is disengaged from sealing ring; and at least one bypass channel defined in the chamber, arranged to communicate between the seat and the exhaust port when the valve element is in the open position.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
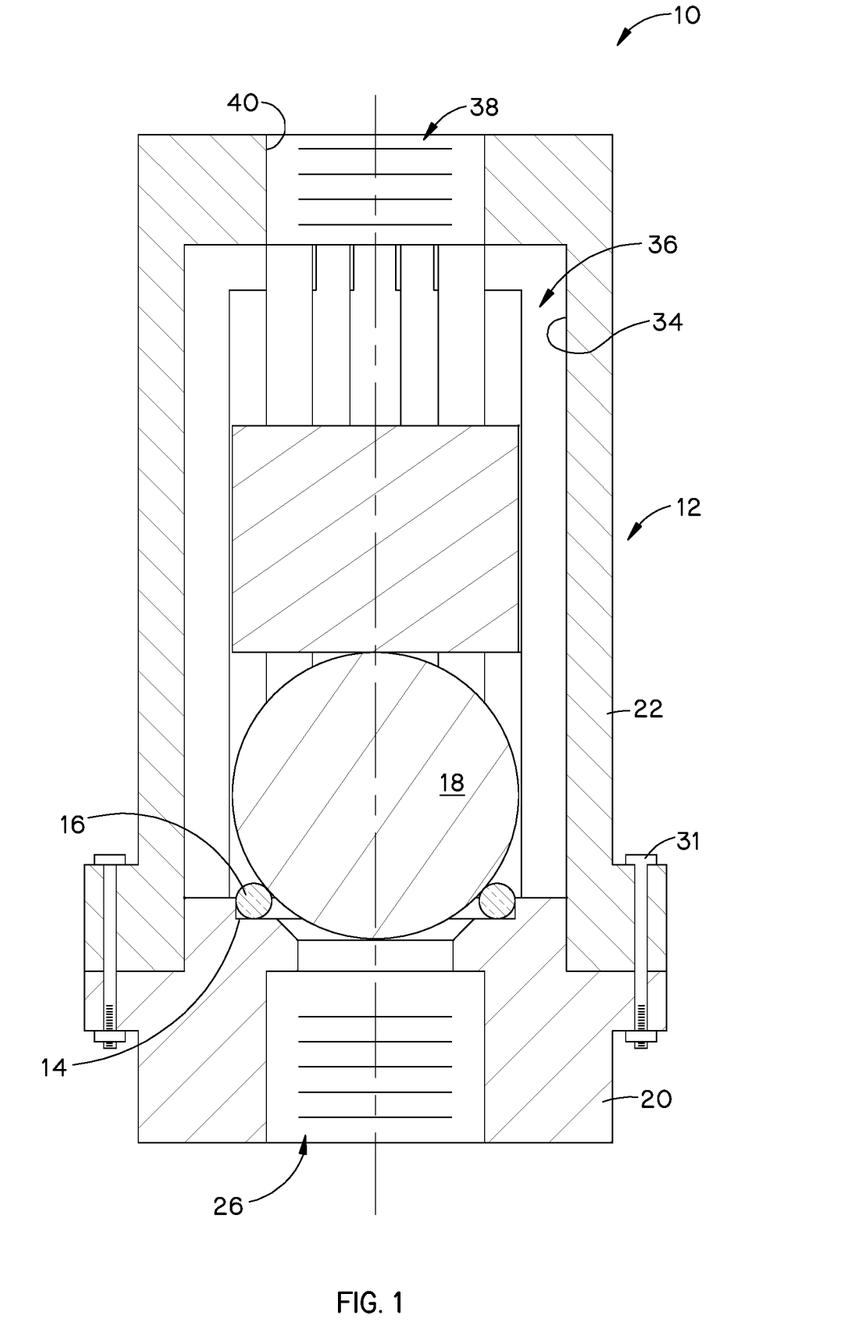
FIG. 1 is a schematic, partially-sectioned view of an exemplary mechanical valve.

Referring to the drawings wherein identical reference numerals denote the same elements throughout the various views, FIG. 1 illustrates an exemplary valve 10. The basic components of the valve 10 are a housing 12, a seat 14, a sealing ring 16, and a valve element 18.

In the illustrated example, the housing 12 comprises a body 20 and a cap 22. The body 20 includes an interior channel 24 in flow communication with an inlet port 26 and the seat 14. The inlet port 26 may include a threaded surface 28, such as a standard pipe thread form, e.g., NPT. The presence of the threaded surface 28 permits the body 20 to be coupled directly to a structure with complementary threads, such as a pipe or pipe fitting (not shown). The pipe thread form may be male or female.

Figure 2:
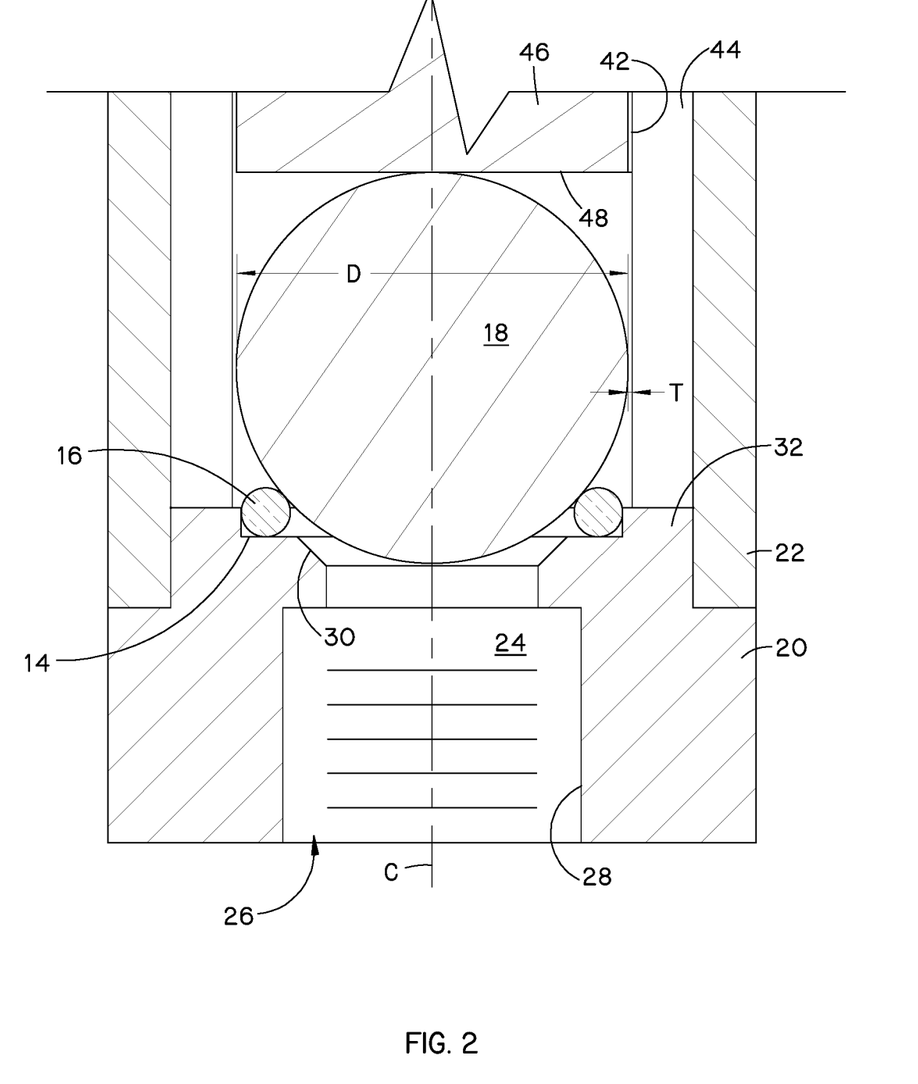
FIG. 2 is an enlarged view of a portion of FIG. 1.

The seat 14 may take the form of a counterbore, groove, or other annular structure suitable to receive and hold a sealing ring 16 as described in more detail below. As best seen in FIG. 2, the body 20 includes a conical transition channel 30 between the seat 14 and the inlet port 26, to provide clearance for the valve element 18.

An annular sealing ring 16 is received in the seat 14. In the illustrated example, the sealing ring 16 is an O-ring with a circular cross-sectional shape. The dimensions and material of the sealing ring 16 may be selected in conjunction with the properties of the valve element 18 to provide desired sealing performance. These parameters are discussed in more detail below.

The cap 22 is connected to the body 20, for example using the illustrated bolts 31 or other suitable fasteners. The body 20 may include a protruding boss 32 which is received in a complementary portion of the cap 22 to provide a seal. Optionally, additional seals such as gaskets or O-rings (not shown) may be provided between the cap 22 and the body 20.

The cap 22 includes an interior surface 34 defining a chamber 36 which is in flow communication with an exhaust port 38 and the seat 14. The exhaust port 38 may include a threaded surface 40, such as a standard pipe thread form, e.g. NPT. The presence of the threaded surface 40 permits the cap 22 to be coupled directly to a structure with complementary threads, such as a pipe or pipe fitting (not shown). The thread form may be male or female.

The valve element 18 is disposed inside the chamber 36 such that it may move between a closed position engaged with the sealing ring 16, blocking flow communication between the inlet port 26 and exhaust port 38, and an open position disengaged from the sealing ring 16, which permits flow between the inlet port 26 and the exhaust port 38.

In the example of FIG. 1, the valve element 18 is a sphere. This shape is useful because even if it rotates in operation, any one sealing diameter will be uniform and circular. The dimensions and material of the valve element 18 may be selected in conjunction with the properties of the sealing ring 16 to provide desired sealing performance. These parameters are discussed in more detail below.

Figure 3:
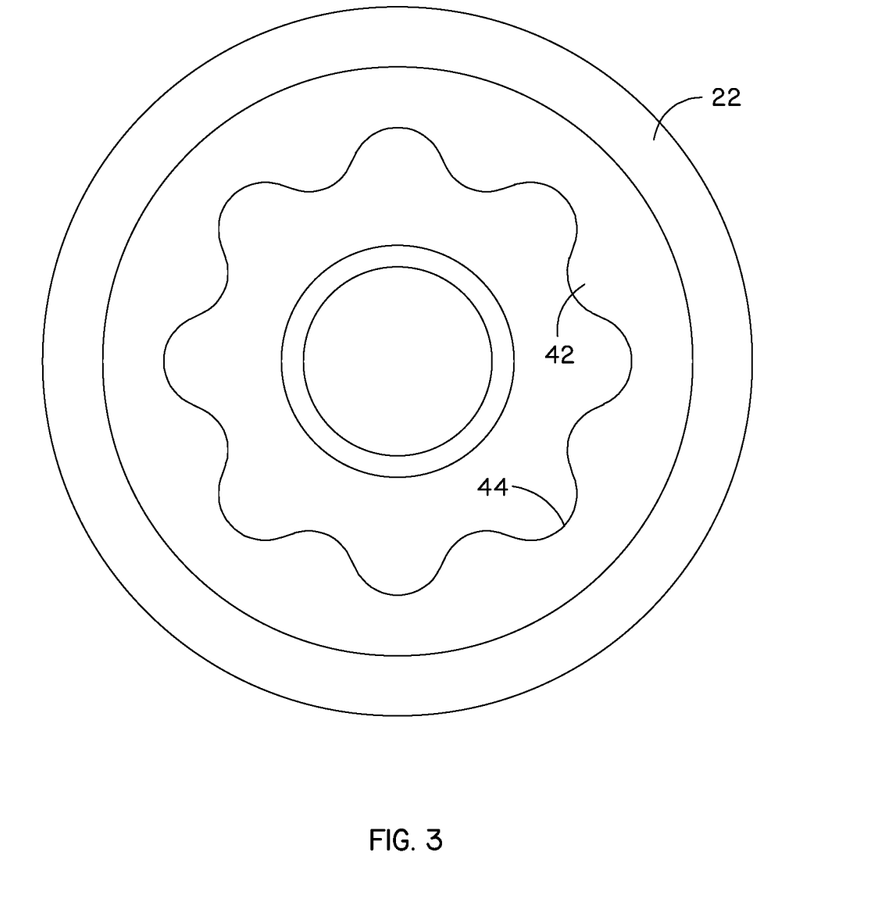
FIG. 3 is a top plan view of a portion of the valve of FIG. 1, showing an interior surface thereof.

The interior surface 34 of the cap 22 is formed into an array of lands 42 and grooves 44 (see FIG. 3). The minimum dimension between the lands 42 is selected to provide a close fit with the maximum diameter of the valve element 18, such that the valve element 18 may move in a vertical direction between open and closed positions as described above, but is held in a concentric position relative to the sealing ring 16.

The grooves 44 define open channels around the valve element 18, also referred to herein as "bypass channels". The purpose of the bypass channels is to allow gas to flow around the valve element 18 and to the exhaust port 38. As described in more detail below, these channels facilitate keeping the valve element 18 centered, which will reduce hysteresis and instability in the valve 10.

Careful selection of the physical parameters of the valve element 18 and the sealing ring 16 will result in good performance. In this context, good performance is defined as ability to maintain a pressure setpoint within a predetermined tolerance at both low and high flow rates. For example, the maximum flow rate may be on the order of 100 times the minimum flow rate.

The sealing ring 16 may be made from an elastomeric material such as natural rubber or synthetic rubber, or from a polymer. Combinations of materials may be used. For best performance, the hardness of the sealing ring 16 is balanced against rigidity. This allows for preferred sealing performance to minimize gas leaks without introducing hysteresis from ultra-soft sealing rings. It is noted that high leakage is undesirable, since typical end uses have a finite gas supply capacity. It will be understood that a harder sealing ring may result in less hysteresis and more consistent performance, while a softer sealing ring may result in better sealing (i.e., less leakage). For applications such as safety relief valves in which the valve setpoint pressure is substantially above an operating pressure of the system, a relatively hard material such as PTFE may be employed, having a hardness of around 50 Shore D. For other applications, a medium-soft durometer value, for example around 50 Shore A, may be used.

The valve element 18 has a material, diameter, and roundness selected to give good characteristics for sealing and where. Materials such as hard polymers or metals may be used. One suitable option is a highly spherical shape to provide uniformity to the sealing ring surface. This will ensure that as the sphere may be allowed to rotate, any one sealing diameter will be uniform and circular, improving low flow performance. In one example, the valve element 18 may be a metallic sphere having a maximum surface finish of 0.13 µm Ra, and a diameter tolerance of +/−0.025 mm (+/−0.001 in.)

Figure 4:
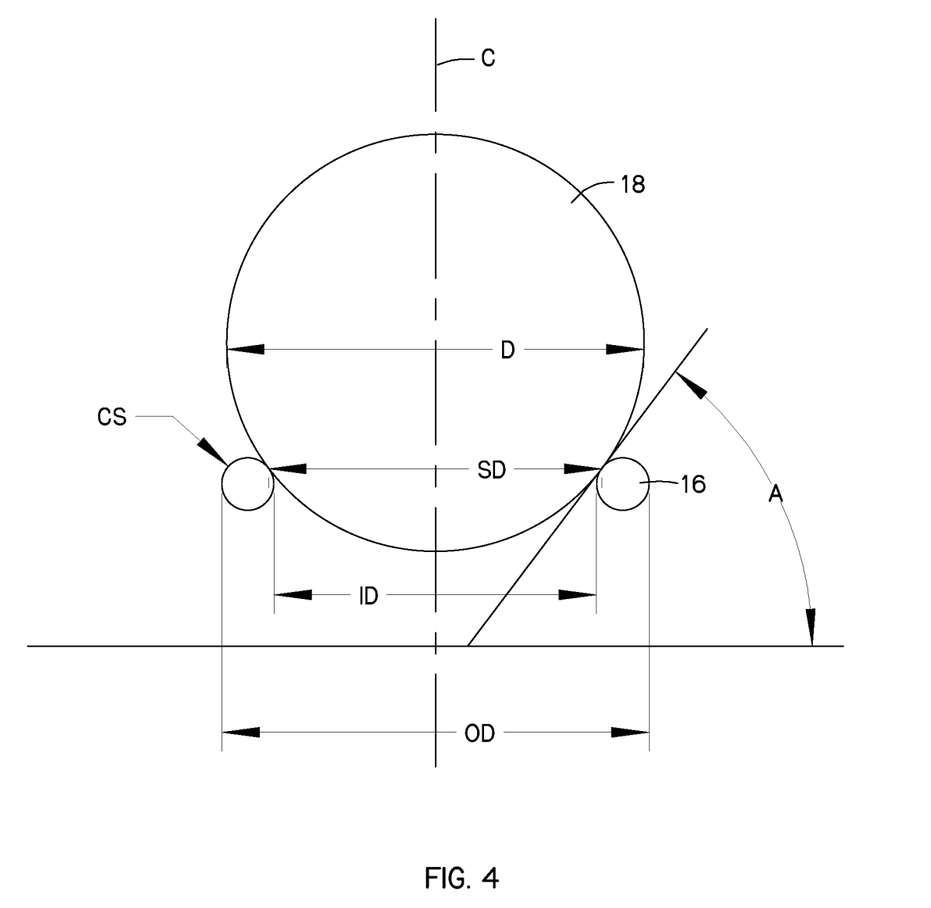
FIG. 4 is a schematic diagram showing a geometric relationship of the valve element and sealing ring of the valve of FIG. 1.

The ratio of valve element diameter "D" to sealing ring diameter "SD" (see FIG. 4) is important). Having the ratio D/SD larger results in less stable operation because there is less constant inlet-side pressure force on the valve element 18, and more variable pressure on the valve element 18 based on the position of the valve element 18 relative to the sealing ring 16, but with a larger sealing ring 16 (i.e., smaller ratio D/SD) there is more constant inlet-side gas pressure on the valve element 18, and less unstable downstream pressure effects on the valve element 18 as the valve element 18 oscillates on the sealing ring 16. So, stability favors relatively larger sealing rings. But, too large of a sealing ring 16 increases static friction ("stiction") on the sealing ring 16 because the radial forces approach the static friction coefficient and the valve element 18 can grab (hysteresis). In one example, a preferred ratio of valve element diameter to sealing ring diameter D/SD may be about 1.32 to about 1.18. Selection of the sealing ring cross-section diameter "CS", inside diameter "ID", and valve element diameter "D" affect the ratio D/SD. Furthermore, since pressure acts normal to a surface, and the object generating the setpoint may be a nearly perfect sphere, the lateral (X-direction) components of the fluid pressure vector act to align the center of gravity of the spherical valve element 18 with the geometric center of the sealing ring, thereby providing high alignment. This is preferred since high alignment allows for optimal sealing (less gas wasted), and reduces frictional forces and wasteful effort generated from the valve element 18 rattling around in the housing 12.

The desired relationship between valve element diameter D and sealing ring diameter SD may be expressed as a contact angle. The contact angle (FIG. 4) may be measured as the angle A between a line which is mutually tangent to the contacting surfaces of the valve element 18 and the sealing ring 16, and a line which is normal to a mutual central axis C of the valve element 18 and the sealing ring 16. In one example, this contact angle A may be about 49 degrees to about 58 degrees. Selection of the sealing ring cross-section diameter "CS", inside diameter "ID", and valve element diameter "D" affect the contact angle A.

Optionally, a weight 46 (FIG. 1) may be provided in the chamber 36 on top of the valve element 18. This separate weight 46 is helpful to provide a means for adjustment, as the valve's setpoint can be changed by using different weights. Furthermore, the use of a separate valve element 18 and weight 46 may be useful in preventing oscillation ("chattering") of the valve element 18 during operation.

In the example shown in FIG. 1, the weight 46 is generally cylindrical, with a planar end surface 48 contacting the valve element 18. The weight 46 may be solid, solid with one or more recesses formed therein, or hollow. The outside diameter of the weight 46 may be selected to provide a close fit with the minimum dimension between the lands 42, such that the weight 46 may freely move in a vertical direction but is held in a concentric position relative to the sealing ring 16.

Figure 5:
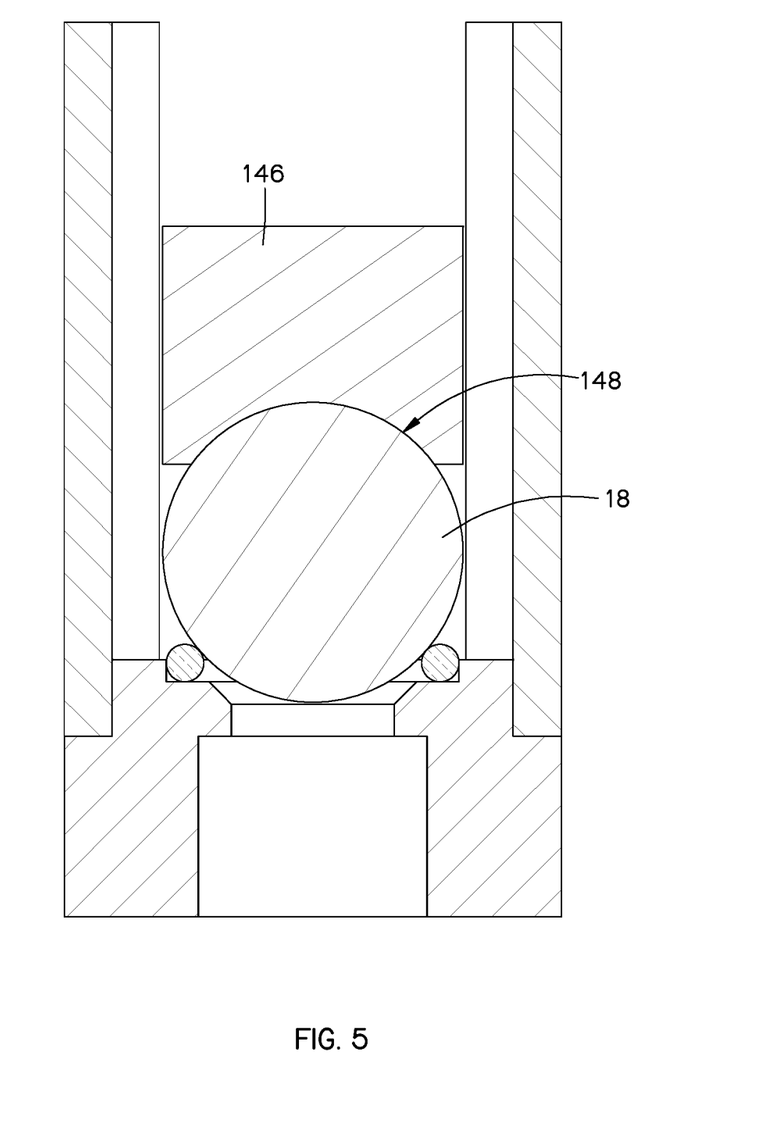
FIG. 5 is a view showing an alternative configuration of a weight.

Alternatively, as seen in FIG. 5, a weight 146 could have a concave end surface 148 contacting the valve element 18. This would provide for a greater mass within the overall combined outside dimensions of the valve element 18 and the weight 146.

Figure 6:
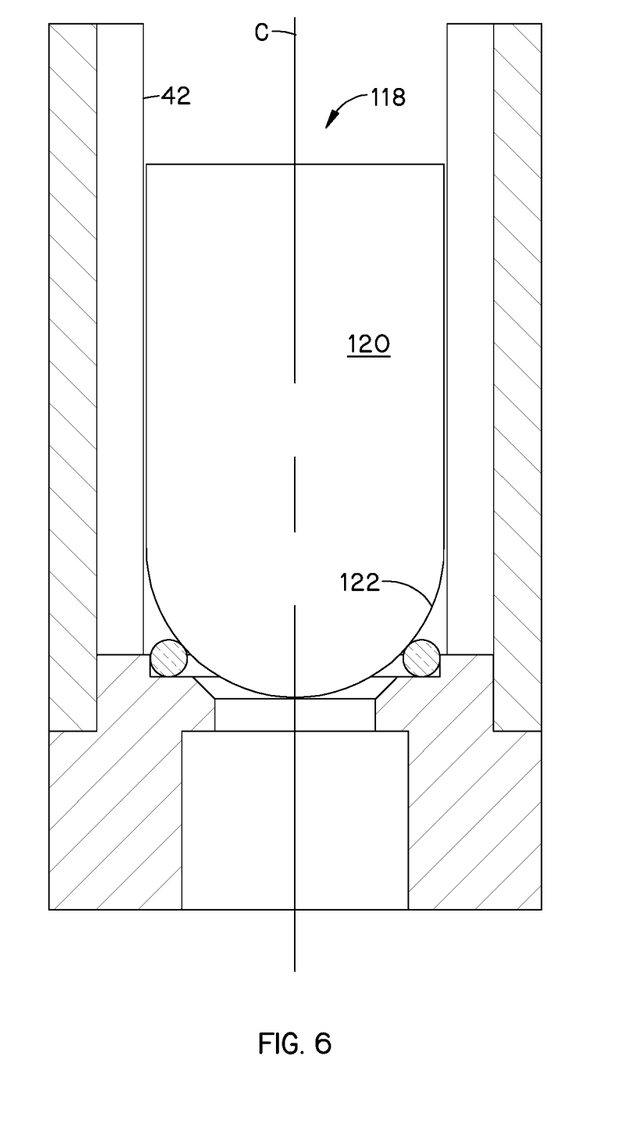
FIG. 6 is a schematic, partially-sectioned view of a valve with a alternative embodiment of a valve element.

FIG. 6 shows an alternative valve element 118. It has an elongated body 120 including a sealing surface 122 which is a body of revolution about central axis "C", e.g. a conical, spherical, or elliptical shape. A hemispherical example is shown. The outside diameter of the valve element 118 may be selected to provide a close fit with the minimum dimension between the lands 42, such that the valve element 118 may freely move in a vertical direction but is held in a concentric position relative to the sealing ring 16. For best performance, the concentricity of the valve element 118 should be held to a tight tolerance. In one example, concentricity of the metal sealing surface may be +/−0.0254 mm (+/−0.001 in.) at the contact band with the sealing ring 16. The sealing function of the valve using the elongated valve element 118 is substantially similar to the operation described above.

One method of operating the valve 10 is by gravity only. In this mode, the mass of the valve element 18 generates a setpoint force in the system as the only resisting force to fluid pressure. This is robust, since gravity is a reliable and repeatable way of setting a force balance within the system. The valve element 18 will only lift once the static pressure below the valve element 18, which is defined by the tangential diameter of the defined ball diameter and sealing ring size.

For gravity operation, the axis C would be positioned vertical (i.e., plumb) to the Earth or nearly so, with the inlet port 26 on the bottom, and the exhaust port 38 on top. As noted above, the separate weight 46 is optional.

The channels in the housing 12 to allow relief gas to move through are important, since minimizing friction during this step is helpful to precision, which is useful when using the mechanical valve to replace precise electronic components.

The lands (FIG. 1) act to keep the valve element 18 in alignment with the geometric center of the sealing ring 16, reducing hysteresis. The open channels around the valve element 18 are activated when the valve element 18 lifts off the sealing ring 16. Additionally, the lands 42 limit the contact area on the valve element 18 from a ring (as would be the case in a sleeve geometry) to a few contact points, which reduces surface friction due to contact. This also reduces hysteresis, and increase accuracy of the valve 10. The radial clearance between the valve element 18 and the lands 42 is an important parameter. Surprisingly, it has been found that less-than-perfect concentricity can improve the ability of the valve element 18 to reliably seat in the seal ring 16. In one example, it has been found that a radial clearance "T" (FIG. 2) of approximately 1.5% to 3% of the valve element diameter D results in good performance. This provides a small amount of room for lateral oscillations which are actually helpful to the dynamic flow performance curve, while keeping the valve element 18 adequately centered relative to the sealing ring 16.

Figure 7:
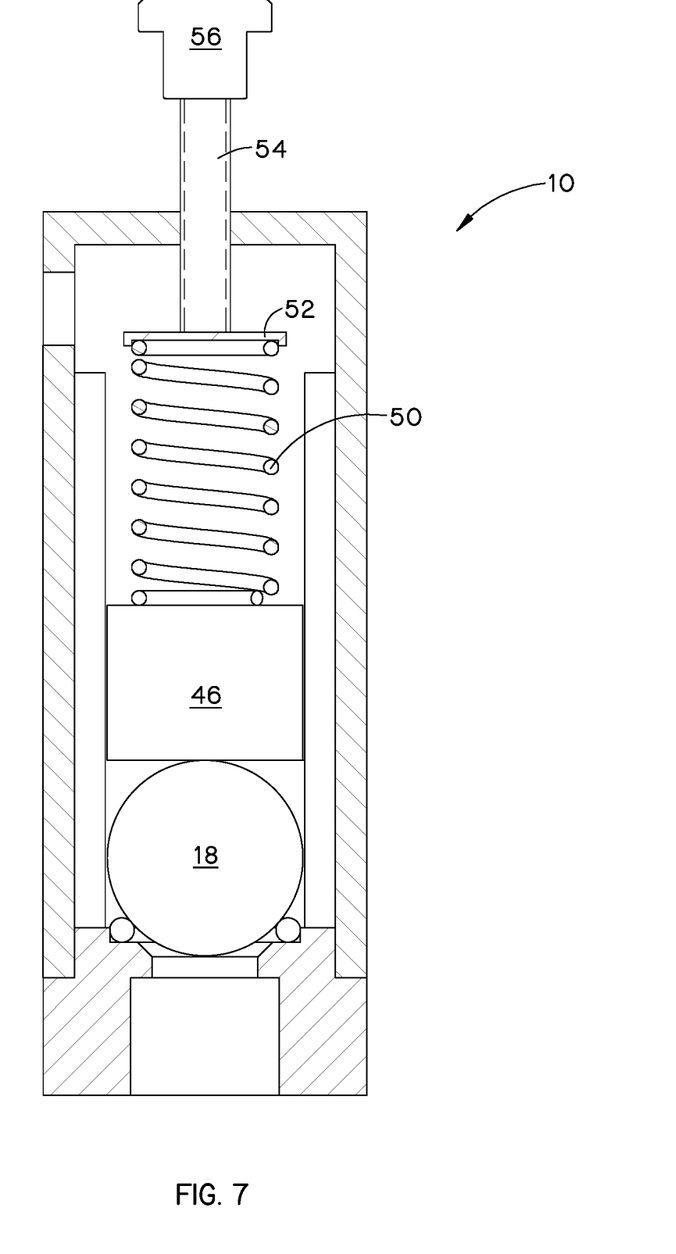
FIG. 7 is a schematic, partially-sectioned view of a valve incorporating a spring adjustment.

Another method of operating the valve 10 is by gravity in combination with spring forces. FIG. 7 illustrates a variation in which the valve 10 is provided with a spring. A compression-type spring 50 is disposed above the valve element 18. The lower end of the spring 50 contacts the valve element 18 (or weight 46 if used) and the upper end of the spring 50 contacts an adjuster assembly comprising a pressure plate 52, adjustment screw 54, and adjustment knob 56. Turning the adjustment screw 54 inwards (downward in the figure) to a desired degree preloads the spring 50 which in turn applies a corresponding load to the valve element 18. Stated another way, the adjuster assembly is operable to apply a variable preload to the spring 50. The addition of the compressible spring 50 will allow for additional forces to resist fluid pressure. The presence of a spring provides the following benefits:

Adjustability through changes in compression to the spring, which changes the applied resistive force;

A convenient and immediate way of adjusting pressure setpoints;

Inertial mass dampening to dampen out ball vibration and "bouncing", which reduces instability in high flow conditions; and Additional downward force for re-alignment on the sealing ring.

The key to the optimal performance for this system is to select the proper spring constant to mass ratio. A preferred configuration for low-pressure control is to have a ratio in which the majority of the point load force is attributed to gravity, and the spring is slightly compressed to provide inertial mass dampening. The stronger the spring force is in the force balance equation, the steeper the pressure versus flow curve will be in the valve. This logic best applies to pilot valves and adjustable check valves/pressure reducing valves, where the low setpoint is almost entirely a result of the weight applied, and the spring to weight ratio largely stays less than 1 for the maximum setpoint.

Inertial dampening springs are helpful in safety relief devices, where the main objective is to relive pressure reliably without significant adjustment to prevent damage to the downstream process.

The various valve embodiments described above may be employed effectively for different purposes and various end applications.

Figure 8:
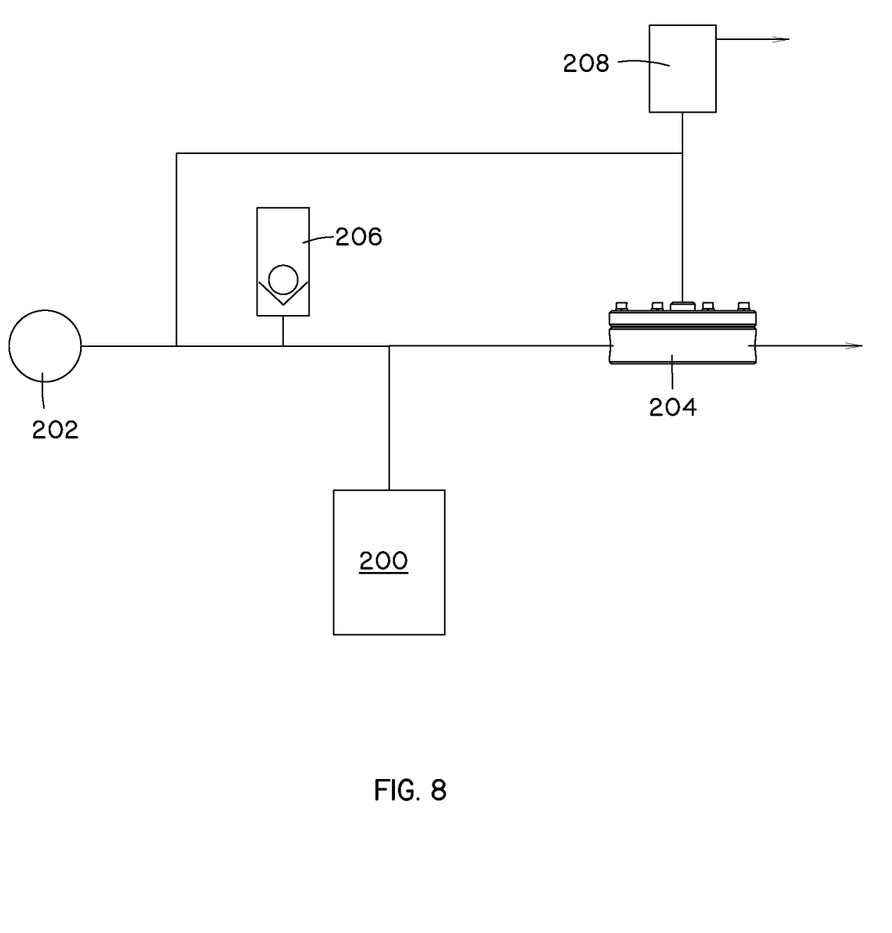
FIG. 8 is a schematic diagram of a system incorporating a mechanical valve.

For example, FIG. 8 depicts schematically a process 200 requiring a regulated gas pressure. Gas pressure is supplied from a gas source 202 such as a pump or storage cylinder. The operating pressure supplied to the process 200 may be regulated by a back pressure regulator 204, for example a diaphragm-type dome-loaded valve.

In one example, a mechanical valve 10 of the type described herein may be used as a overpressure relief valve or safety valve, item 206, coupled between the gas supply 202 and the process 200. The objective of a safety relief device is to reliably protect against overpressurization, which has the potential to damage the process 200. The valve 206 is a simple device that minimizes the number of moving parts. In this application, the gravity-only configuration may be preferred. As one example, this type of valve may be used in applications requiring a setpoint from 55 to 103 mbar.

In another example, a mechanical valve of the type described herein may be used as a pilot valve 208 coupled between the gas supply 202 and the back pressure regulator 204 to reliably send a pneumatic signal to the back pressure regulator 204. The mechanical valve 10 described herein is robust to supply pressure changes, and reliably relieves near the desired setpoint. As one example, this type of valve may be used in applications requiring setpoints in ranges of 5-25 mbar or 40-70 mbar.

Figure 9:
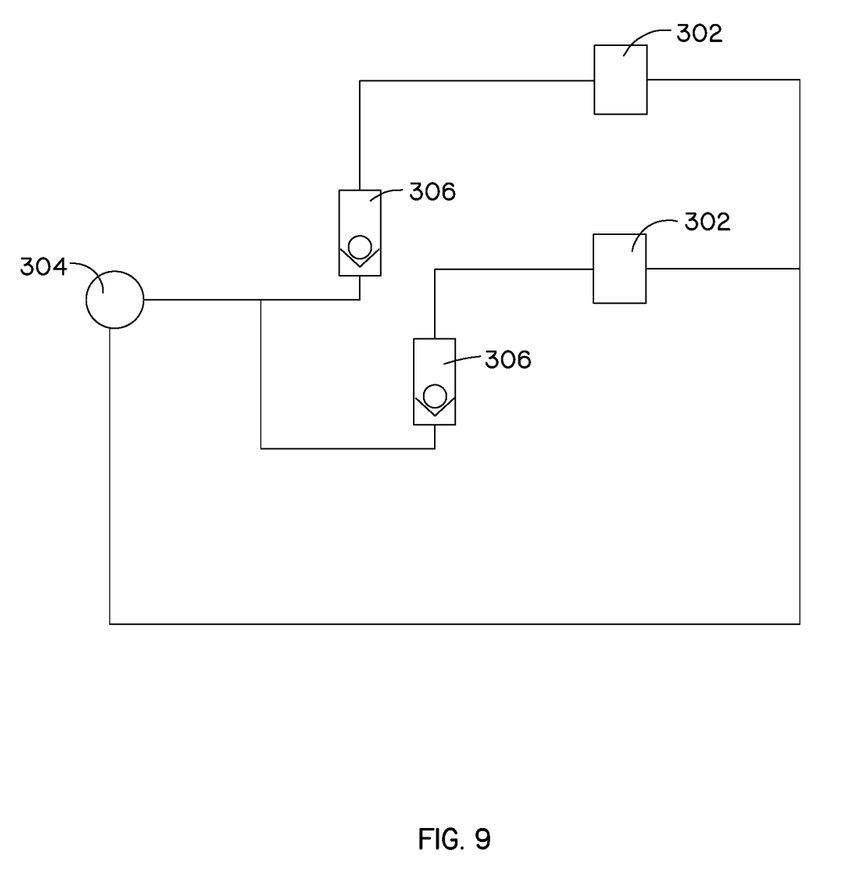
FIG. 9 is a schematic diagram of a system incorporating a mechanical valve.

FIG. 9 depicts schematically first and second processes 300, 302 each requiring a regulated gas pressure. Gas pressure is supplied from a gas source 304 such as a pump or storage cylinder. This figure only shows two processes, but theoretically an indefinite amount of processes can be supported as long as there is capacity from the gas source 304 to supply appropriately all processes with enough volumetric flow. The operating pressure supplied to each process 300, 302 is regulated by mechanical valves of the type described above, items 306, 308, coupled between the gas supply 304 and the respective processes 300, 302

In this application, each valve 300, 302 may act as a differential pressure valve. As described earlier, the valve element in this system only moves if the net static fluid pressure is greater than the downward gravity force. Thus, there is a minimum point load force required, which can be then translated to a static fluid pressure. In the schematic above, the downstream pressure will be non-zero, but will always be less than the supply pressure P_supply. Thus, this device will open when the subtraction of P_supply−P2 (p2=downstream pressure), and thus the same requirement for the differential to exceed the gravity force must be met for flow to resume or cease. This will then mean that by carefully selecting the right diameter and density of the valve element setpoint, differential pressure check control is achievable.

As one example, this type of valve may be used in applications requiring setpoints in a range of range of 5-70 mbar.

Figure 10:
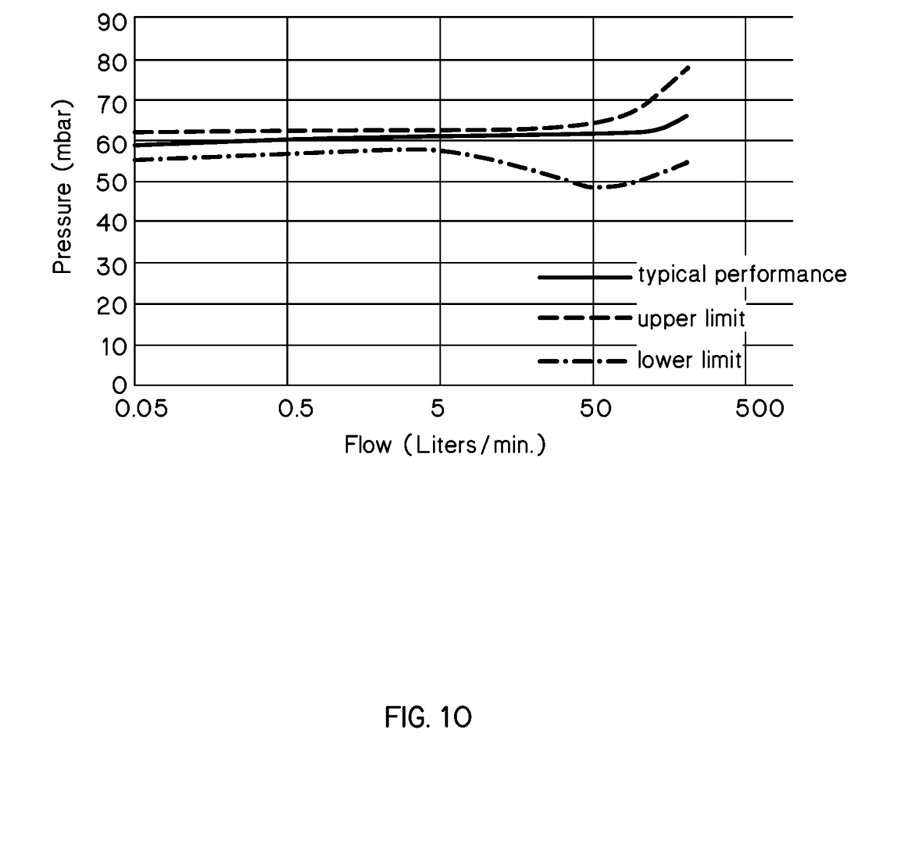
FIG. 10 is a chart showing test performance of a valve as described herein.

The valves as described herein exhibit extremely good precision compared to prior art valves. As an example, FIG. 10 illustrates the performance of the valve 10 tested in a gas system with a pressure setpoint of 60 mbar. It can be seen that the valve 10 is capable of maintaining system pressure within plus or minus 10% of the setpoint overflows from 0.05 L per minute to 5 L per minute, or a flow range of 100:1. Such performance is not seen in prior art valves.

The foregoing has described a valve. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A valve, comprising:
   a housing defining a chamber communicating with an inlet port and an exhaust port;
   a seat disposed in the housing between the inlet port and the exhaust port;
   an elastomeric or polymer sealing ring disposed in the seat, wherein the sealing ring is an O-ring;
   a valve element having a sealing surface that is a body of revolution, the valve element positioned in the housing such that it is moveable between a closed position in which the sealing surface is engaged with the sealing ring and an open position in which the sealing surface is disengaged from sealing ring;
   at least one bypass channel defined in the chamber, arranged to communicate between the seat and the exhaust port when the valve element is in the open position; and
   wherein the sealing surface and the sealing ring define a contact angle having a minimum value of approximately 45 degrees.

2. The valve of claim 1 wherein the sealing surface is convex.

3. The valve of claim 1 wherein the sealing surface is spherical.

4. A valve, comprising:
   a housing defining a chamber communicating with an inlet port and an exhaust port;
   a seat disposed in the housing between the inlet port and the exhaust port;
   an elastomeric or polymer sealing ring disposed in the seat;
   a valve element having a sealing surface that is a body of revolution, the valve element positioned in the housing such that it is moveable between a closed position in which the sealing surface is engaged with the sealing ring and an open position in which the sealing surface is disengaged from sealing ring;
   at least one bypass channel defined in the chamber, arranged to communicate between the seat and the exhaust port when the valve element is in the open position;
   wherein the valve element is a sphere; and
   wherein the sphere has a maximum surface finish of 0.13 µm Ra, and a diameter tolerance of +/−0.025 mm.

5. The valve of claim 1 wherein the sealing ring has a hardness of approximately 50 Shore A.

6. The valve of claim 1 wherein the sealing ring has a hardness of approximately 50 Shore D.

7. The valve of claim 1 wherein the sealing surface and the sealing ring define a contact angle from approximately 49 degrees to approximately 58 degrees.

8. The valve of claim 1 wherein the chamber is defined by an interior surface of the housing, and the interior surface includes a plurality of lands and grooves defining the bypass channels.

9. A valve, comprising:
   a housing defining a chamber communicating with an inlet port and an exhaust port;
   a seat disposed in the housing between the inlet port and the exhaust port;
   an elastomeric or polymer sealing ring disposed in the seat;
   a valve element having a sealing surface that is a body of revolution, the valve element positioned in the housing such that it is moveable between a closed position in which the sealing surface is engaged with the sealing ring and an open position in which the sealing surface is disengaged from sealing ring;
   at least one bypass channel defined in the chamber, arranged to communicate between the seat and the exhaust port when the valve element is in the open position; and
   a weight disposed between the valve element and the exhaust port, wherein the weight includes a planar end surface contacting the valve element.

10. A valve, comprising:
    a housing defining a chamber communicating with an inlet port and an exhaust port;
    a seat disposed in the housing between the inlet port and the exhaust port;
    an elastomeric or polymer sealing ring disposed in the seat;
    a valve element having a sealing surface that is a body of revolution, the valve element positioned in the housing such that it is moveable between a closed position in which the sealing surface is engaged with the sealing ring and an open position in which the sealing surface is disengaged from sealing ring;
    at least one bypass channel defined in the chamber, arranged to communicate between the seat and the exhaust port when the valve element is in the open position; and
    a weight disposed between the valve element and the exhaust port, wherein the weight includes a concave end surface conforming to the valve element.

11. The valve of claim 1 further comprising a spring disposed between the valve element and the housing, the spring arranged to urge the valve element towards the closed position.

12. The valve of claim 11 further comprising an adjuster assembly operable to apply a variable preload to the spring.

13. The valve of claim 1 wherein the chamber is configured to limit movement of the valve element substantially to rotation about a central axis and translation about the central axis.

* * * * *